Dec. 5, 1961  O. DAHLE  3,011,340
MEANS FOR MEASURING A TORSIONAL STRESS IN
A SHAFT OF MAGNETOSTRICTIVE MATERIAL
Filed June 10, 1958  2 Sheets-Sheet 2
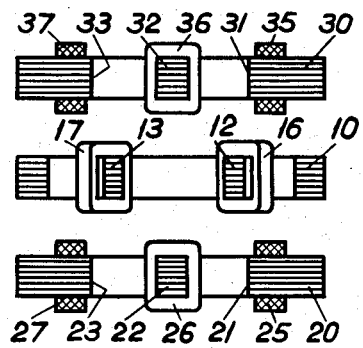
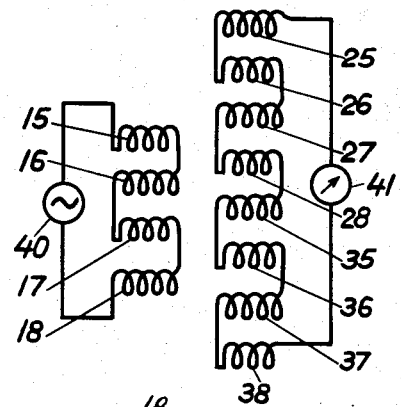
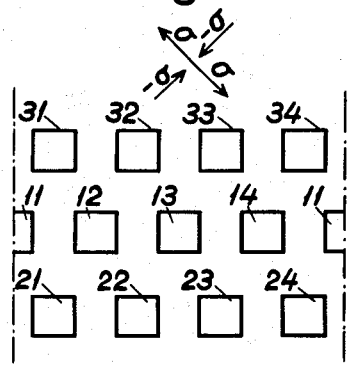
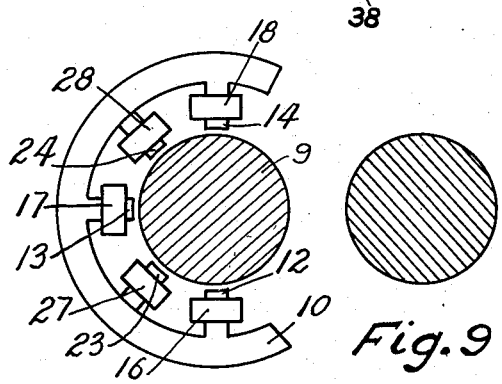
Inventor
Orvar Dahle
By
Attorney

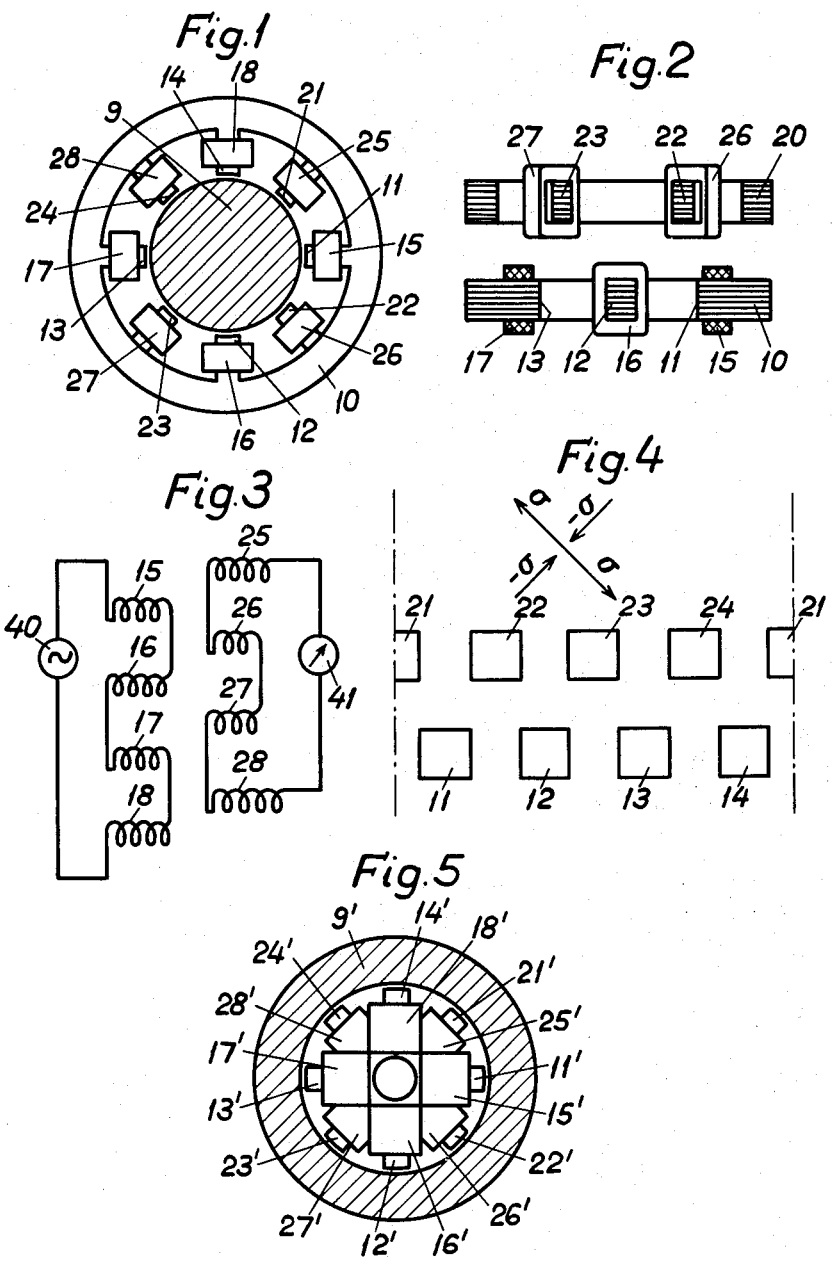

United States Patent Office 3,011,340
Patented Dec. 5, 1961

3,011,340
MEANS FOR MEASURING A TORSIONAL STRESS IN A SHAFT OF MAGNETOSTRICTIVE MATERIAL
Orvar Dahle, Vasteras, Sweden, assignor to Allmänna Svenska Elektriska Aktiebolaget, Vasteras, Sweden, a corporation of Sweden
Filed June 10, 1958, Ser. No. 741,061
Claims priority, application Sweden June 26, 1957
9 Claims. (Cl. 73—136)

It is known in the art to make use of the magnetostriction in a shaft of ferromagnetic material in order to measure the torsional stress in the shaft. By a known method the measuring is performed by means of two magnetic cores with windings, which produce magnetic fields in the surface of the shaft, the directions of which coincide with the directions of the mechanical main stresses. When the shaft is subjected to a torsional stress its permeability in the direction of one of the main stresses increases and decreases in the direction of the other one, which causes the inductances of the windings to change. The change in the inductance is a measure of the torsional stress in the shaft and is measured by means of a measuring bridge. Due to the fact that the greater part of the reluctance lies in the air gap this measuring method has however the disadvantage that it requires a very accurate measuring bridge and that it is very sensitive to variations in the air gap.

According to another known measuring method, as shown in Patent No. 2,912,642, based on the magnetostrictive characteristic of the shaft, the measuring is performed by means of two magnetic circuits intersecting each other, the pole faces of which face the surface of the shaft. One of the magnetic circuits is excited by an alternating current and the other serves as a measuring device. When the shaft is subjected to a torsional stress a leak flux is produced which induces a voltage in a winding encircling the measuring magnetic circuit. This voltage is used as a measure of the torsional stress. This method has the disadvantage that inhomogeneities and irregular anisotropies in the shaft cause variations in the output voltage of the device when the shaft rotates. In order to keep these undesired voltage variations small, the base surface of the measuring device has to be so large that the faults in the shaft only influence a small portion of the active shaft surface. The base surface of the measuring device has, however, to be substantially equilateral which causes its axial extension to become large. This is a disadvantage as generally only small axial spaces are available.

The present invention is fundamentally an improvement of the last mentioned measuring device. By means of the invention it is possible to make the axial extension of the measuring device smaller and to obtain a measurement which is less dependent on irregularities in the shaft and shaft materials. According to the invention a means for measuring the torsional stress in a shaft of magnetostrictive material comprises two substantially equal magnetic cores having salient poles facing the shaft and being arranged side by side in the direction of the shaft and displaced substantially half a pole pitch in relation to one another, one of said magnetic cores being provided with an excitation winding connected to an alternating current source and the other core being provided with a measuring winding connected to an electric measuring device.

A device according to the present invention has a very small axial extension and is highly insensitive to small inhomogeneities and local stress concentrations in the shaft.

A device with only two cores is however magnetically unsymmetrical and is therefore influenced by eddy currents generated at the rotation of the shaft and by the hysteresis of the shaft material. In order to eliminate these disturbances the device according to the invention is provided with three substantially equal magnetic cores having salient poles facing the shaft and being arranged side by side at fixed axial distances from one another, the magnetic core situated in the middle being provided with an excitation winding connected to an alternating current source, and the other two cores being provided with measuring windings connected to an electric measuring device.

According to the invention the magnetic cores can either be shaped similarly to stator cores with poles pointing radially inwards and be intended to encircle the shaft or be shaped similarly to rotor cores with poles pointing radially outwards and be intended to be inserted in a hollow shaft.

The invention is described in the following, with reference to the accompanying drawing. FIGURE 1 in the drawing is an axial view of an embodiment of the invention with two stator shaped magnetic cores. FIGURE 2 is a top plan view, partly in section, of the device shown in FIGURE 1. FIGURE 3 is the circuit diagram of the measuring device shown in FIGURES 1 and 2. FIGURE 4 is a plane projection of the shaft surface under the poles of the measuring device shown in FIGURES 1, 2 and 3 and shows the position of the poles as well as the main stresses in the shaft surface. FIGURE 5 shows an embodiment of the invention with two rotor shaped cores for measuring inside a hollow shaft. FIGURE 6 is a top plan view, partly in section, of a device according to the invention with three stator shaped cores. FIGURE 7 is a circuit diagram of a measuring device according to FIGURE 6 and FIGURE 8 is a plane projection of the shaft surface under the poles of the measuring device according to FIGURES 6 and 7. Corresponding parts in the different figures are provided with the same reference numbers. FIGURE 9 is an axial view of an embodiment of the invention especially usable when two shafts are close together.

In FIGURE 1, 9 designates a shaft, the torsional stress in which is to be measured. The shaft 9 is encircled by two laminated, magnetic cores 10 and 20, provided with poles 11—14 and 21—24 respectively, which face the shaft and lie a short distance from it. The poles 11—14 and 21—24 are provided with coils 15—18 and 25—28 respectively. The device consequently resembles two stators with salient poles. The coils 15—18 of the magnetic core 10 are connected in series or in parallel, to an alternating current source and have alternating winding directiions so that the poles 11—14 have alternating magnetic polarities. The coils 25—28 on the magnetic core 20 are, in a similar manner, connected to an electric measuring device, in the shown embodiment a measuring instrument. The circuit diagram of the measuring device is shown in FIGURE 3, in which 40 designates the alternating current source and 41 the measuring instrument.

The two magnetic cores 10 and 20 are stationarily arranged at a short axial distance from one another and are displaced half a pole pitch in relation to one another. The poles 11—14 and 21—24 of the magnetic cores 10 and 20 have consequently a mutual position as shown in FIGURE 4.

The poles 11—14 have alternating polarities and produce, in pairs, congruent magnetic fields in the shaft surface as long as the shaft 9 is not subjected to any stress. Due to the fact that the poles 21—24 are displaced half a pole pitch in relation to the poles 11—14 they will be positioned above points having the same magnetic potential. Due to this no magnetic flux from the shaft 9 flows through the core 20 and consequently no voltage is induced in the coils 25—28 connected to the measuring instrument 41.

When the shaft 9 is exposed to a torsional stress the mechanical stresses in the shaft may be divided up into two perpendicular main stresses $\sigma$ and $-\sigma$ one of them a tension stress $\sigma$ and other a compressive stress $-\sigma$, the directions of which subtend at an angle of 45° with the axis of the shaft. The main $\sigma$ and $-\sigma$ stresses are shown in FIGURE 4. Due to the magnetostrictive qualities of the shaft material the permeability in the shaft surface increases in the direction of one of the main stresses $\sigma$ and decreases in the direction of the perpendicular main stress $-\sigma$. This causes the magnetic field from the magnetic core 10 to be deformed so that the difference in the magnetic potential between the pole pairs 12, 22:13, 23:14, 24:11, 21 decreases and increases between the pole pairs 11, 22:12, 23:13, 24:14, 25. Consequently, the poles 21—24 of the core 20 will be positioned above points having different magnetic potentials so that a magnetic flux flows through the poles 21—24 and induces a voltage in the corresponding windings 25—28, which causes a current to flow through the measuring instrument 41. A torsional stress in the shaft has consequently the same effect on the measuring instrument 41 as a displacement of the core 20 in relation to the core 10. Within the measuring range of the device the deflection of the instrument 41 is proportional to the torsional stress in the shaft 9.

It is evident from the figures that the measuring device according to the invention can be given a very small axial length despite the fact that it entirely encircles the shaft. Due to the fact that all mechanical stresses in a closed annular path of the shaft surface permanently take part in the measuring, small inhomogeneities and stress concentrations will remain within the measuring zone when the shaft rotates, because of which their injurious influence upon the measuring becomes much smaller than in the measuring devices hitherto known. The measuring device according to the invention is further of an extremely simple and rigid construction.

If the shaft 9 is hollow the torsional stresses can also be measured from the inner surface of the shaft. In order to perform such measuring the stator shaped device described above is substituted by a rotor shaped measuring device having a corresponding construction and mode of action. Such a device is shown in FIGURE 5 in which the reference numbers from FIGURES 1–4 are provided with primes.

As the device described above, with two magnetic cores, is unsymmetric from the magnetic point of view, an undesired influence is produced by the hysteresis of the shaft material and by eddy currents. This influence can be avoided if the device is provided with three cores so that it becomes symmetric as shown in FIGURES 6, 7 and 8.

FIGURE 6 shows three stator shaped cores 10, 20 and 30 which encircle a shaft. These magnetic cores 10, 20 and 30 are provided with four poles each, 11—14, 21—24 and 31—34 respectively. The poles 11—14, 21—24 and 31—34 lie at a small distance from the shaft and are provided with coils 15—18, 25—28 and 35—38 respectively. The coils 15—18 on the magnetic core 10 are connected in series or in parallel to an alternating current source and have alternating winding directions so that the poles 11—14 have alternating magnetic polarities. The coils 25—28 on the magnetic core 20 and 35—38 on the magnetic core 30 are, in a similar manner, connected to a measuring device. The circuit diagram of the device is shown in FIGURE 7, in which 40 designates the alternating current source and 41 designates the instrument. The magnetic cores 10, 20 and 30 are arranged at a small axial distance from one another and the cores 20 and 30 are displaced half a pole pitch in relation to the core 10. The mutual position of the poles is shown in the FIGURE 8.

The device according to the FIGURES 6, 7 and 8 operates fundamentally in the same way as the device in FIGURES 1, 2, 3, and 4. When the shaft is subjected to no stress the poles 21—24 and 31—34 lie above points having the same magnetic potential, because of which no magnetic flux flows through the magnetic cores 20 and 30 and consequently no voltage is induced in the windings 25—28 and 35—38 connected to the measuring instrument 41.

When the shaft is exposed to torsional stress the magnetic field from the magnetic core 10 is deformed due to the mechanical stresses $\sigma$ and $-\sigma$ and to the magnetostrictive qualities of the shaft material so that the difference in the magnetic potential between the pole pairs 11, 21:12, 22:13, 23:14, 24:11, 34:12, 31:13, 32:14, 33 decreases and increases between the pole pairs 11, 24:12, 21:13, 22:14, 23:11, 31:12, 32:13, 33:14, 34. Due to this the poles 21—24 and 31—34 of the cores 20 and 30 respectively, will be positioned in pairs, above points with different magnetic potential so that a flux flows through the poles and induces a voltage in the windings 25—28 and 35—38, which causes a current to flow through the measuring instrument 41. Within the measuring range of the device the deflection of the instrument 41 is proportional to the torsional stress in the shaft 9, if the excitation from the poles 11—14 has a suitable value.

A device with three magnetic cores can of course also be constructed according to FIGURE 5 with rotor shaped cores intended to be inserted in a hollow shaft.

The embodiments of the invention shown in the drawing are especially advantageous but several other embodiments are also possible. It is for example not necessary that the magnetic cores entirely encircle the shaft, but the measuring can be performed by segments of the cores, provided that the segment of the core 10 has at least three poles and the segments of the cores 20 and 30 respectively have at least two poles. This arrangement is used when two shafts 9 are placed so close that there will be no place for the magnetic cores between the shafts as will be seen in FIGURE 9. Of course it may also be used when the shaft is placed so near something else, for example a wall or the like, that it is impossible to get the cores around the shaft. The magnetic cores may of course be divided into two or more portions in order to obtain a simpler assemblage and the number of poles may be varied without changing the mode of operation of the device.

In order to make the device insensitive to external magnetic fields, iron masses etc., it should be provided with a magnetic shielding.

I claim as my invention:

1. Means for measuring a torsional stress in a shaft of magnetostrictive material, comprising two substantially equal magnetic cores having at least two salient poles each and being arranged side by side in the axial direction of said shaft at a fixed axial distance from one another and aligned normal to the axis of said shaft with said poles facing a surface of said shaft, the poles of one of said cores being displaced in relation to the poles of the other core substantially half a pole pitch in the peripheral direction of said shaft, an excitation winding on one of said cores and a measuring winding on the other core, an alternating current source connected to said excitation winding and an electric measuring device connected to said measuring winding.

2. Means as claimed in claim 1, in which said shaft is provided with an axial hole, said cores being shaped similarly to rotor cores with salient poles pointing radially outwards, and intended to be inserted into said hole of said shaft with said poles facing the inner surface of said hole.

3. Means as claimed in claim 1, in which said magnetic cores are shaped similarly to stator cores with salient poles pointing radially inwards and intended to encircle said shaft with said poles facing the outer surface of said shaft.

4. Means as claimed in claim 1, in which said magnetic cores are shaped as ring sectors with salient poles pointing radially inwards, and intended to partially encircle said shaft with said poles facing the outer surface of said shaft.

5. Means for measuring a torsional stress in a shaft of magnetic material, comprising three substantially equal magnetic cores having at least two salient poles each and being arranged one after another in the axial direction of said shaft at fixed axial distances from one another and aligned normal to the axis of said shaft with said poles facing a surface of said shaft, the poles of the outer ones of said cores being in alignment with one another, the poles of the middle one of said cores being displaced in relation to the poles of the outer cores substantially half a pole pitch in the peripheral direction of said shaft, two sets of windings, one arranged on said middle core and the other one on said outer cores, an alternating current source connected to one of said sets of windings, an electric measuring device connected to the other one of said sets of windings.

6. Means as claimed in claim 5, in which said alternating current source is connected to said set of windings arranged on said middle core and said electric measuring device is connected to said set of windings arranged on said outer cores.

7. Means as claimed in claim 5, in which said shaft is provided with an axial hole, said cores being shaped similarly to rotor cores with salient poles pointing radially outwards, and intended to be inserted into said hole of said shaft with said poles facing the inner surface of said hole.

8. Means as claimed in claim 5, in which said magnetic cores are shaped similarly to stator cores with salient poles pointing radially inwards and intended to encircle said shaft with said poles facing the outer surface of said shaft.

9. Means as claimed in claim 5, in which said magnetic cores are shaped as ring sectors with salient poles pointing radially inwards, and intended to partially encircle said shaft with said poles facing the outer surface of said shaft.

References Cited in the file of this patent

UNITED STATES PATENTS

| | | |
|---|---|---|
| 2,370,845 | Davis | Mar. 6, 1945 |
| 2,553,833 | Rifenbergh | May 22, 1951 |
| 2,557,393 | Rifenbergh | June 19, 1951 |
| 2,885,644 | Grant | May 5, 1959 |